(12) United States Patent
Khoury et al.

(10) Patent No.: US 8,283,795 B2
(45) Date of Patent: Oct. 9, 2012

(54) MECHANICAL MOTION CHARGING SYSTEM ON AN ELECTRIC VEHICLE

(76) Inventors: Michel Joseph Khoury, Deerfield Beach, FL (US); Vasa Jovanov, Pompano Beach, FL (US)

(*) Notice: Subject to any disclaimer, the term of this patent is extended or adjusted under 35 U.S.C. 154(b) by 336 days.

(21) Appl. No.: 12/802,688

(22) Filed: Jun. 11, 2010

(65) Prior Publication Data

US 2010/0314887 A1 Dec. 16, 2010

Related U.S. Application Data

(60) Provisional application No. 61/186,402, filed on Jun. 12, 2009.

(51) Int. Cl.
*F03G 7/00* (2006.01)
(52) U.S. Cl. .......................................... 290/1 R
(58) Field of Classification Search .................. 290/1 R, 290/1 A See application file for complete search history.

(56) References Cited

U.S. PATENT DOCUMENTS

| | | | |
|---|---|---|---|
| 407,385 A * | 7/1889 | Wilsey et al. .................... | 74/131 |
| 1,557,570 A | 10/1925 | Eckman et al. | |
| 3,559,027 A | 1/1971 | Arsem | |
| 3,861,487 A | 1/1975 | Gill | |
| 3,921,746 A | 11/1975 | Lewus | |
| 3,939,935 A | 2/1976 | Gill | |
| 3,981,204 A | 9/1976 | Starbard | |
| 4,024,926 A | 5/1977 | Butoi | |
| 4,032,829 A | 6/1977 | Schenavar | |
| 4,218,624 A | 8/1980 | Schiavone | |
| 4,387,781 A | 6/1983 | Ezell et al. | |
| 5,036,934 A | 8/1991 | Nishina et al. | |
| 5,427,194 A | 6/1995 | Miller | |
| 6,111,375 A | 8/2000 | Zenobi | |
| 6,841,970 B2 * | 1/2005 | Zabramny ..................... | 320/101 |
| 6,952,060 B2 | 10/2005 | Goldner et al. | |
| 7,161,254 B1 | 1/2007 | Janky et al. | |
| 7,304,398 B1 * | 12/2007 | Kim et al. ..................... | 290/1 E |
| 7,408,266 B2 | 8/2008 | Yeh | |
| 7,847,421 B2 * | 12/2010 | Gardner et al. ............... | 290/1 R |
| 7,938,217 B2 * | 5/2011 | Stansbury, III ............... | 180/165 |
| 7,989,970 B2 * | 8/2011 | Yeh ............... | 290/1 C |
| 2007/0089924 A1 * | 4/2007 | de la Torre et al. ............ | 180/305 |
| 2010/0006362 A1 * | 1/2010 | Armstrong ..................... | 180/165 |
| 2012/0074702 A1 * | 3/2012 | Ahdoot ............................ | 290/53 |

FOREIGN PATENT DOCUMENTS

GB 2065983 A * 7/1981
JP 2004011753 A * 1/2004

\* cited by examiner

*Primary Examiner* — Joseph Waks
(74) *Attorney, Agent, or Firm* — Robert M. Downey, P.A.

(57) ABSTRACT

A system in an electric vehicle converts the mechanical energy resulting from movement of the vehicle chassis to electric energy. The system has one or more energy conversion units including an alternator with a rotatable shaft and a weighted fly wheel fixed to the shaft. A female receptor on an end of the alternator shaft is disposed in spaced, axial alignment with a male driver on the end of a spiral ratcheting shaft that is operatively engaged with a pivoting lever and the chassis of the vehicle, whereupon upward and downward motion of the chassis frame causes the male driver to move between engagement and disengagement with the female receptor. A ratchet mechanism drives rotation of the spiral ratcheting shaft upon engagement of the male driver with the female receptor, thereby rotating the female receptor, flywheel and alternator shaft. The male driver disengages from the female receptor, allowing the fly wheel and alternator shaft to freely rotate in order to generate electric energy which is used to continuously charge a bank of batteries for powering the electric vehicle.

7 Claims, 3 Drawing Sheets

MECHANICAL MOTION CHARGING SYSTEM ON AN ELECTRIC VEHICLE

This application is based on provisional patent application Ser. No. 61/186,402 filed on Jun. 12, 2009.

BACKGROUND OF THE INVENTION

1. Field of the Invention

The present invention is directed to a recharging system for electric vehicles and, more particularly, to a system that converts mechanical energy of the up and down movement of the vehicle's frame to electricity for continuously charging one or more batteries used for powering the electric vehicle.

2. Discussion of the Related Art

Rising prices of gasoline and diesel fuel, along with environmental concerns and dependency on foreign oil supplies, has led to a movement towards alternative energy sources, and particularly alternative energy for powering motor vehicles. A number of major of automobile manufacturers are now offering vehicles that are either partially electric powered (i.e., hybrid vehicles) or fully powered by electric energy. Hybrid vehicles are powered by both a combustion engine that burns gasoline fuel and an electric motor that is energized by electricity stored in one or more batteries. The electric motor powers the hybrid vehicle from start and through lower speeds. At higher speeds, the combustion engine of the hybrid vehicle assumes operation to provide power to the drive train, while simultaneously driving an alternator for recharging the one or more batteries in the vehicle.

Fully electric vehicles rely exclusively on electric power that is stored in one or more batteries. Recharging the batteries requires connection to an electric power source, typically with the use of a power cord that plugs into an electric power outlet in a garage or other suitable location. The recharging process takes at least several hours. Accordingly, the daily range of fully electric vehicles is limited and proper planning for recharging is essential to avoid being stranded when the battery power is depleted.

During normal operation of any land vehicle, a great deal of mechanical energy from movement of structural components of the vehicle is unused. In particular, the up and down movement of the vehicle's chassis due to uneven road surfaces, bumps and turns produces a significant amount of mechanical energy. This energy is typically dissipated by the shock absorber and dampened for the comfort of the vehicle occupants. However, this kinetic energy that is constantly produced during movement of the vehicle can be harnessed, converted to electrical energy, and used to supplement the electric energy stored in the vehicle batteries or, alternatively, to fully and continuously charge the batteries as the primary electric power source.

In the past, others have attempted to convert mechanical energy from road shock in motor vehicles. Examples of these electric energy generation systems can be found in the U.S. Patents to Schiavone, U.S. Pat. No. 2,418,624; Schenaver, U.S. Pat. No. 4,302,829; Arsem, U.S. Pat. No. 3,559,027; and Butoi, U.S. Pat. No. 4,024,926. These systems, as well as other systems in the related art, suffer from drawbacks that limit their efficiency in recharging the vehicle batteries. In particular, all of these systems lose a significant amount of energy as a result of friction of the engaging components of the recharging system that converts mechanical energy to electric energy.

Accordingly, there remains a need in the relevant art for a more efficient system in an electric vehicle that converts the mechanical energy of the up and down movement of the vehicle chassis (i.e., frame) to electric energy in order to recharge one or more batteries carried in the vehicle.

OBJECTS AND ADVANTAGES OF THE INVENTION

Considering the foregoing, it is a primary object of the present invention to provide a system in an electric vehicle for converting the mechanical energy of the up and down movement of the vehicle chassis (i.e., frame) to electric energy for use to continuously charge one or more batteries used for powering the electric vehicle.

It is a further object of the present invention to provide a highly efficient system in an electric vehicle that harnesses the mechanical (i.e., kinetic) energy of the up and down movement of a vehicle's chassis due to uneven road surfaces, bumps and turns, and wherein the system converts this harnessed mechanical energy to electric energy for use to power the vehicle.

It is still a further object of the present invention to provide a highly efficient system in an electric vehicle that harnesses the energy that is normally dissipated by the shock absorbers and dampened for the comfort of vehicle occupants, and wherein the system converts this harnessed mechanical energy to electric energy for continuously charging one or more batteries that store the electric energy for powering the electric vehicle.

It is still a further object of the present invention to provide a highly efficient system in an electric vehicle that continuously charges one or more batteries in the vehicle using the mechanical energy that naturally results from up and down movement of the vehicle's frame as the vehicle travels over uneven road surfaces, bumps and turns.

It is still a further object of the present invention to provide a highly efficient system for continuously charging one or more batteries of an electric vehicle during movement of the vehicle, and wherein the system includes one or more energy conversion units structured for converting mechanical energy resulting from the up and down movement of the vehicle chassis to electric energy, and further wherein each of the energy conversion units includes one or more low RPM (approximately 1,000 RPM's or less) and at least one lithium ion battery.

It is still a further object of the present invention to provide a highly efficient system in an electric vehicle for converting mechanical energy to electric energy, and wherein the system includes one or more energy conversion units each including an alternator and correspondingly aligned engaging members that engage and disengage to drive rotation of the one or more alternators, and further wherein disengagement of the correspondingly aligned engaging components, along with a weighted fly wheel, allows for more efficient driven rotation of the alternators with reduced friction.

These and other objects and advantages of the present invention are more readily apparent with reference to the detailed description and accompanying drawings.

SUMMARY OF THE INVENTION

A system in an electric vehicle converts the mechanical energy of the up and down movement of the vehicle chassis to electric energy in order to deliver a continuous charge to the vehicle's batteries. The system provides for one or more energy conversion units, each being located near a wheel of the vehicle. Each energy conversion unit includes an alternator having a rotatable shaft and a weighted fly wheel fixed to the shaft. A female receptor is mounted to an end of the alternator shaft and in axial alignment with a male driver on the end of a spiral ratcheting shaft. The male driver is normally disposed in spaced, disengaged relation to the female receptor. The spiral ratcheting shaft is operatively engaged with a pivoting lever and the chassis of the vehicle, whereupon upward and downward motion of the chassis frame causes the male driver to move between engagement and disengagement with the female receptor. A ratchet mechanism drives rotation of the spiral ratcheting shaft upon engagement of the male driver with the female receptor, thereby rotating the female receptor, flywheel and alternator shaft. As the vehicle chassis returns to a normal position, the male driver disengages from the female receptor, allowing the fly wheel and alternator shaft to freely rotate in order to generate electric energy which is used to continuously charge a bank of batteries that store electric energy for powering the electric vehicle.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
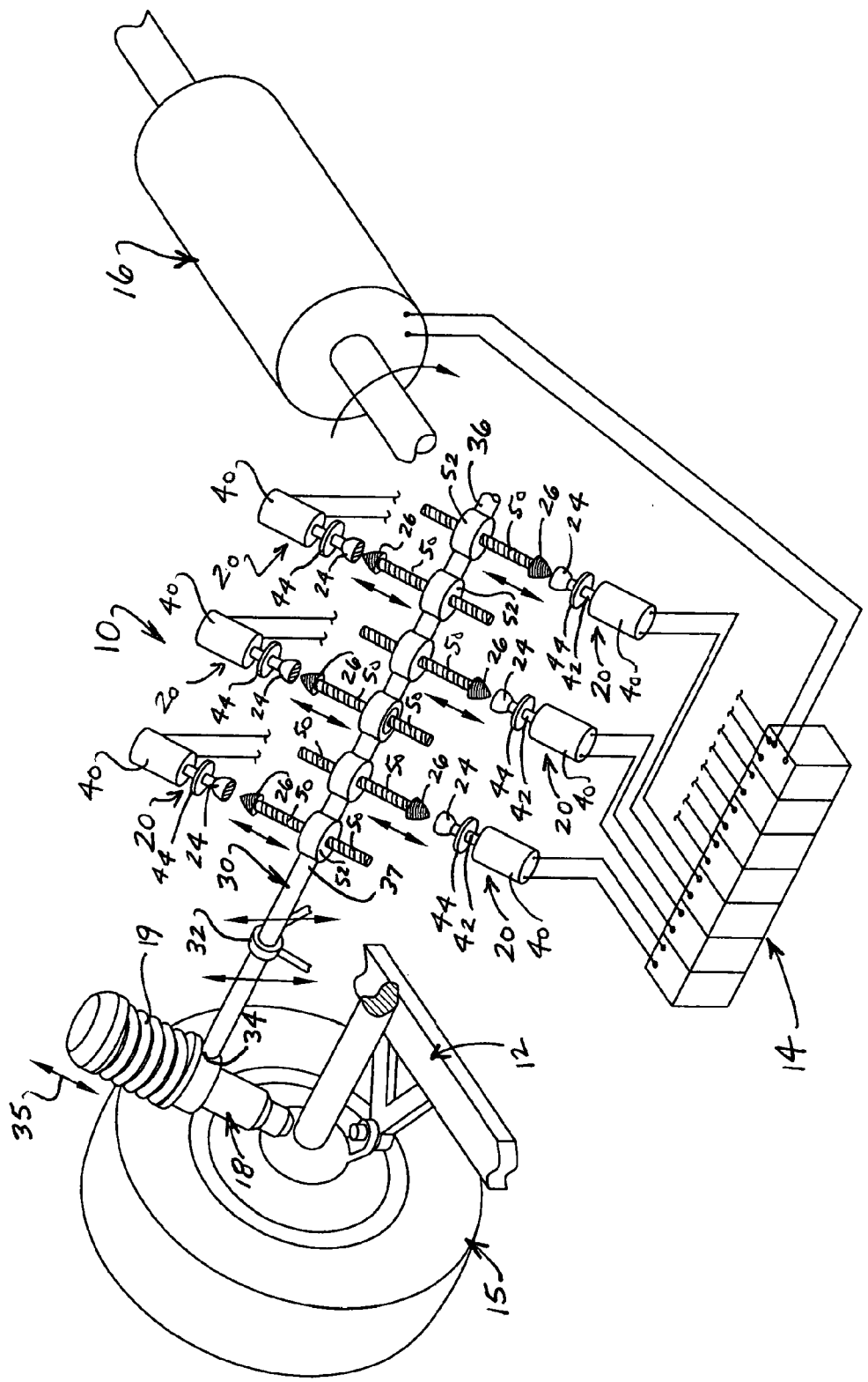
FIG. 1 is a perspective view showing a preferred embodiment of the mechanical motion charging system of the present invention operatively positioned and connected in relation to a chassis near one wheel location and an electric motor for delivering drive power in an electric vehicle.
Figure 3:
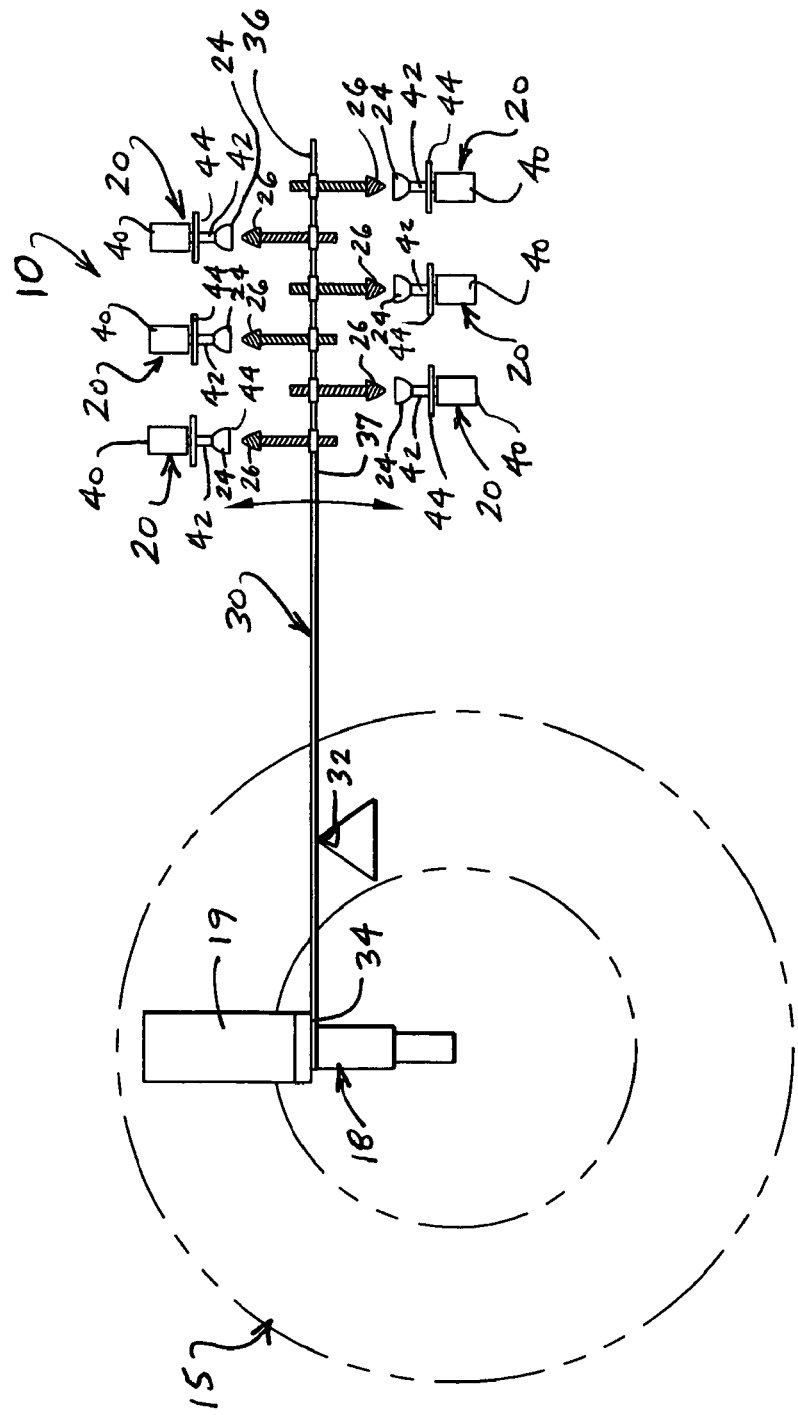
FIG. 3 is a general schematic diagram of the energy conversion system of the present invention for converting mechanical motion to electric energy.

Referring to the several views of the drawings, and initially FIGS. 1 and 3, the mechanical motion battery charging system of the present invention is shown and is generally indicated as 10. The system 10 of the present invention is specifically structured and disposed for converting the mechanical energy resulting from up and down movement of a vehicle chassis 12 to electric energy in order to deliver a continuous charge to one or more batteries 14 in a vehicle. More particularly, the system 10 is adapted for use in an electric vehicle in order to continuously charge a bank of batteries 14 used for supplying power to an electric motor 16 that powers the drive train of the electric vehicle.

The system 10 has one or more energy conversion units 20 operatively disposed in relation to a pivot point 32 of a lever 30 or other moving structure attached to or linked with the chassis 12 (i.e., frame) of the vehicle. In the embodiment shown in FIG. 1, one end 34 of a lever 30 connects to a spring member 18 near one of the vehicle wheels 15. The spring member 18 is operatively engaged with the vehicle chassis 12. As the vehicle travels over uneven road surfaces, bumps and turns, the chassis 12 moves up and down and forces a lower portion of the spring member 18 upwardly and downwardly. A spring 19 at the top portion of the spring member 18 absorbs some or all of this upward and downward movement of the vehicle chassis 12. The one end 34 of the lever 30, connected below the spring 19, is driven up and down as illustrated by the arrows 35 in FIG. 1. The pivot point 32, located closer to the one end 34 of the lever 30, allows the lever 30 to pivot in a rocking motion, whereupon one end 34 of the lever moves down as an opposite end portion 36 of the lever 30 moves up. Accordingly, as the one end 34 of the lever is driven upwardly, the end portion 36 of the lever 30 on the opposite side of the pivot point 32 moves down. Likewise, as the one end 34 of the lever is moved downwardly in response to movement of the vehicle chassis 12, the opposite end portion 36 of the lever (i.e., on the opposite side of the pivot point) moves upwardly.

The system 10 of the present invention provides for at least one energy conversion unit 20 positioned along the opposite segment (i.e., longer segment) 37 of the lever relative to the pivot point 32. In a preferred embodiment, multiple energy conversion units 20 are optimally positioned in spaced relation at various distances from the pivot point 32 along the opposite segment of the lever 30. As the lever segment 37 moves up and down, the correspondingly positioned energy conversion units 20 are operatively engaged and disengaged in order to convert the mechanical motion to electric energy.

More specifically, each energy conversion unit 20 has correspondingly positioned engaging and disengaging members 24, 26 which, when engaged, drive rotation of an alternator 40. A weighted flywheel 44 on the alternator input shaft 42 allows the alternator input shaft 42 to continue to spin, for an extended period of time, after disengagement of the engaging members 24, 26. Use of multiple energy conversion units 20 allows for a continuous supply of electric energy generated by the several alternators 40 for storage in a battery bank 14. In a preferred embodiment, the battery bank 14 consists of two or more lithium ion batteries and the alternators 40 are of a low RPM type, generally 1,000 RPM's or less. The electric energy that is continuously delivered to the lithium ion batteries, during movement of the electric vehicle, is used to supply electric power for energizing the electric motor 16.

Figure 2:
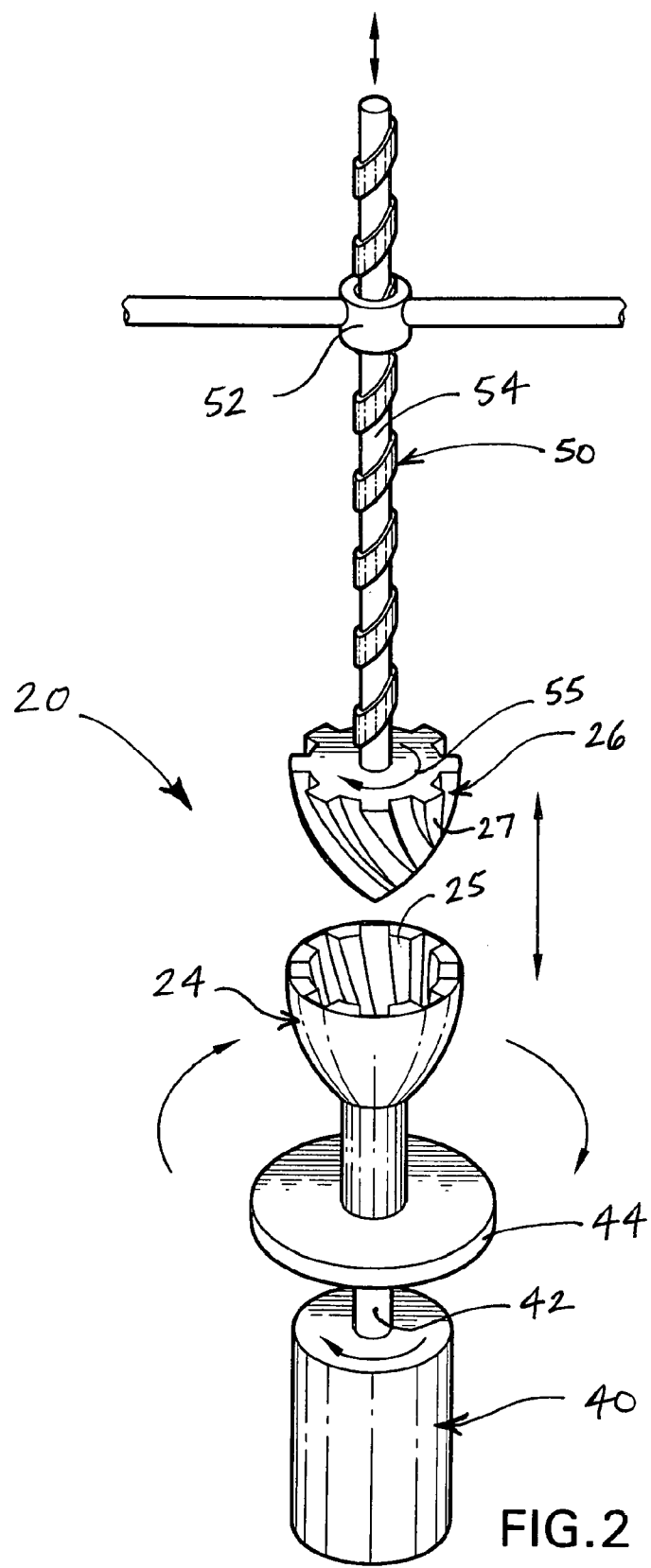
FIG. 2 is an isolated perspective view illustrating one energy conversion unit of the mechanical motion charging system of the present invention.

FIG. 2 shows one of the energy conversion units 20 in more detail. Each energy conversion unit 20 includes the alternator 40 that has a rotatable energy input shaft and the weighted flywheel 44 fixed thereto. A female receptor 24 defines the first engaging member and is mounted to an end of the alternator input shaft 42 and is disposed in axial alignment with a male driver 26 on the end of a spiral ratcheting shaft 50. The male driver 26 defines the second engaging member and is normally disposed in a spaced, disengaged relation to the female receptor 24. The spiral ratcheting shaft 50 is operatively engaged with the pivoting lever 30, whereupon upward and downward motion of the lever 30 as the chassis of the vehicle moves up and down, causes the male driver 26 to move into and out of engagement with the female receptor 24. The female receptor 24 and the male driver 26 have corresponding engaging gear teeth 25, 27 respectively, for biting engagement with one another. The spiral ratcheting shaft 50 extends through a ratchet mechanism 52 on the lever 30. The ratchet mechanism 52 drives rotation of the spiral ratcheting shaft 50 upon engagement of the male driver 26 with the female receptor 24, thereby rotating the female receptor 24, flywheel 44 and the alternator input shaft 42. Specifically, a pawl or other guide element within the ratchet mechanism travels within the spiral groove 54 of the shaft 50. When the male driver 26 engages with the female receptor 24, an upward force on the spiral ratcheting shaft 50 causes the spiral ratcheting shaft to be pushed upwardly through the ratchet mechanism 52. As this happens, the pawl within the ratchet mechanism 52 travels within the spiral groove 54 to impart a rotational motion of the spiral ratcheting shaft 50 and male driver 26, as illustrated by the arrow 55 in FIG. 2. When the lever 30 moves in an opposite direction and the male driver 26 disengages from the female receptor 24, the spiral ratcheting shaft 50 is urged back (downwardly) through the ratchet mechanism 52 to a normal or start position, as shown in FIG. 2. As the male driver 26 disengages from the female receptor 24, the flywheel 44 and alternator shaft 42 are allowed to freely rotate in order to generate electric energy, with reduced friction.

FIG. 3 demonstrates the mechanical efficiency of the system 10. More specifically, the pivot point 32 is positioned closer to the first end 34 of the lever, so that the opposite end portion 36 of the lever, where the energy conversion units 20 are positioned, moves through a greater range of motion compared to the smaller degree of up and down motion of the first end 34 of the lever 30 at the spring member 18. This leveraged arrangement allows for driven rotation and operation of each of the alternators 40, even with relatively slight up and down movements of the vehicle chassis 12.

While the present invention has been shown and described in accordance with a preferred and practical embodiment thereof, it is recognized that departures from the instant disclosure are fully contemplated within the spirit and scope of the present invention, which should not to be limited, except as defined in the following claims as interpreted under the Doctrine of Equivalents.

What is claimed is:

1. A system for charging batteries in a vehicle that has a chassis and an electric motor for powering the vehicle, said system comprising:
    a structural member that is responsive to up and down movement of at least one component of the vehicle resulting from the vehicle traveling over uneven surfaces and through turns;
    at least one energy conversion unit for converting kinetic mechanical energy resulting from the up and down movement to electric energy and including:
        an alternator with a rotatable power input shaft, said alternator being structured and disposed for generating electricity when the power input shaft is rotated;
        a weighted flywheel fixedly mounted on the power input shaft of said alternator for promoting prolonged rotation of the power input shaft after removal of an external rotational force exerted on the power input shaft;
        a first engaging member fixed to the power input shaft of said alternator;
        a second engaging member normally disposed in disengaged relation to the first engaging member and operatively linked to the structural member, and the second engaging member being structured and disposed for movement into momentary engagement with the first engaging member upon movement of the structural member in at least one direction in response to the up down movement;
        a rotational assembly linked to the second engaging member for drivingly rotating the second engaging member and the first engaging member upon the momentary engagement of the first and second engaging members, and thereby defining the external rotational force exerted on the power input shaft for rotating the power input shaft; and
        said alternator being connected to the batteries for delivering the generated electricity for storage in the batteries and thereby providing a continuous electric charge to the vehicle's batteries.

2. The system as recited in claim 1 wherein said structural member is a lever having a first end connected to the at least one component of the vehicle.

3. The system as recited in claim 2 wherein said lever is pivotally moveable about a pivot point between the first end of said lever and an opposite second end of said lever, and the pivot point being closer to the first end of said lever.

4. The system as recited in claim 1 wherein:
    said first engaging member is a female receptor; and
    said second engaging member is a male driver structured and disposed for driven engagement with said female receptor.

5. The system as recited in claim 4 wherein said female receptor and said male driver include corresponding gear teeth for biting rotational engagement upon engagement of said male driver with said female receptor.

6. The system as recited in claim 5 wherein said rotational assembly includes a ratchet mechanism on the structural member and a spiral ratcheting shaft extending from said male driver and through the ratchet mechanism, and said ratchet mechanism being structured and disposed for imparting a rotational force on said spiral ratcheting shaft upon forced engagement of said male driver with said female receptor.

7. The system as recited in claim 1 further comprising:
    a plurality of said energy conversion units each including said alternator, said weighted flywheel, said first engaging member, said second engaging member, and said rotational assembly.

* * * * *